Patented Nov. 24, 1953

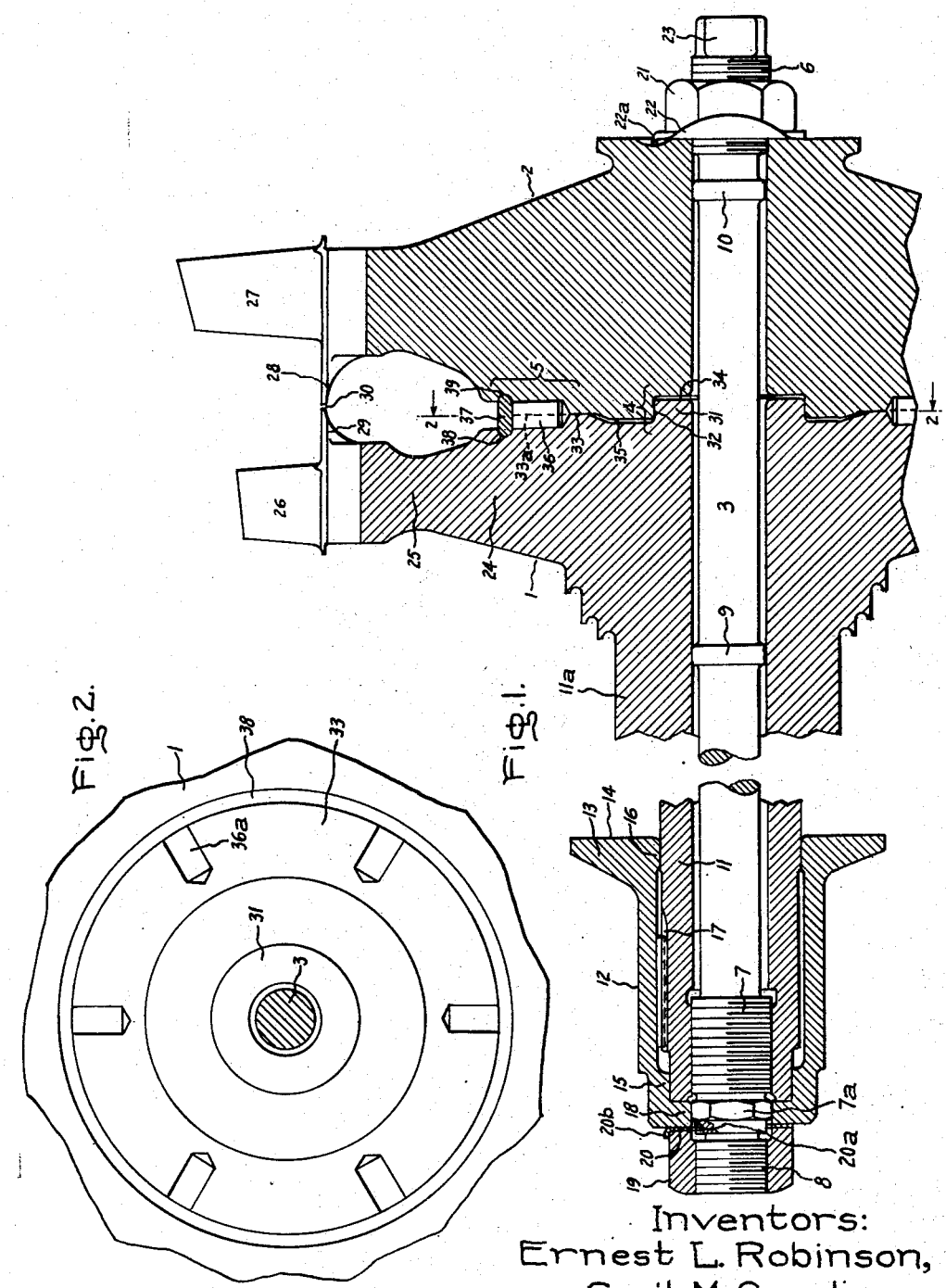
Inventors:
Ernest L. Robinson,
Cecil M. Gardiner,
by Ernest C. Britton
Their Attorney.

2,660,399

UNITED STATES PATENT OFFICE 2,660,399

COMPOSITE MULTISTAGE TURBO-MACHINE ROTOR

Ernest L. Robinson and Cecil M. Gardiner, Schenectady, N. Y., assignors to General Electric Company, a corporation of New York Application July 11, 1951, Serial No. 236,246

3 Claims. (Cl. 253—39)

This invention relates to turbomachine rotors having a plurality of separately fabricated bucket-wheels secured together, and particularly to a high temperature gas turbine rotor of the type described.

Many attempts have been made to design high temperature turbomachine rotors of the multi-stage axial flow type which are cheap and simple to fabricate, yet designed to meet the extremely rigorous operating conditions, having long service life, and arranged to facilitate disassembly for inspection, cleaning, repair, and other maintenance. This invention provides a composite multi-stage axial flow turbine rotor which is found particularly well suited to gas turbine service in applications where long service life and utmost reliability are of paramount importance.

Accordingly, the object of the present invention is to provide an improved multi-stage axial flow gas turbine rotor having a plurality of separately fabricated bucket-wheels secured together by simple, yet very effective, means insuring accurate concentricity and permitting ready assembly and disassembly.

Other objects and advantages will become apparent from the following description taken in connection with the accompanying drawing, in which Fig. 1 represents a longitudinal section through a two-stage axial flow rotor arranged in accordance with the invention; and Fig. 2 is an end view of one bucket-wheel with the other removed, taken on the plane 2—2 in Fig. 1.

Generally, the invention is practiced by separately fabricating two or more bucket-wheels and then securing them together by means of a single central axially extending through-bolt with a rabbet fit between the hub portions of the separate wheels for assuring concentricity, especially during manufacture, surrounded by special radially disposed keys for assuring alignment during operation and for transmitting torque between the disks.

Referring now more particularly to the drawing, the composite gas turbine rotor shown comprises a first-stage bucket-wheel indicated generally at 1, a second-stage bucket-wheel indicated generally at 2, a central through-bolt 3, locating means comprising an interfitting rabbeted hub portion indicated generally at 4, surrounded by special radial key means indicated at 5.

As will be apparent from the drawing, the through-bolt 3 is provided with three axially spaced threaded portions 6, 7, and 8. The portion of the bolt between the threads 6, 7 is of substantial axial length and of reduced cross-section area, so as to be capable of a substantial amount of axial stretching, without risk of failure in the threads, in order that the bucket-wheels will be held tightly together in spite of differential thermal expansion occurring between wheels and bolt, as described more particularly hereinafter. It will also be observed that the bolt 3 is provided with a plurality of axially spaced, enlarged "lands" 9, 10, of a diameter to snugly fit the bores of the bucket-wheels, so that the comparatively long bolt is supported against vibration or "whipping" in operation.

The first-stage wheel assembly 1 is provided with an axially extending stub-shaft portion 11, which may be forged integral with the bucket-wheel or separately fabricated and welded thereto. It will be appreciated by those skilled in the art that this stub-shaft includes a portion 11a adapted to be engaged by a journal bearing (not shown), and the extreme end of the stub-shaft may be adapted to receive a coupling member, as, for instance, that shown at 12. In the present case, the member 12 comprises a sleeve having at one end an outwardly extending flange 13 forming a radially disposed surface 14 adapted to cooperate with suitable thrust bearing means (not shown) for axially locating the rotor. This member 12 may also be adapted to carry a gear for taking power from the turbine rotor, or coupling means for connecting the turbine rotor to another rotor member, for instance, the rotor of a compressor used to furnish air to a gas turbine combustion chamber. The precise manner in which the sleeve member 12 is used in a particular application is not important to the present invention; therefore, these alternate arrangements are not disclosed more fully, but it is of interest to note the way in which sleeve 12 is supported on stub-shaft 11.

It will be observed that sleeve 12 has end portions 15, 16 snugly fitting the stub-shaft to insure accurate concentricity therewith. Between these axially spaced fitted portions, sleeve 12 and stub-shaft 11 are provided with interfitting spline teeth indicated generally at 17. The left-hand end of coupling sleeve 12 forms a radially inwardly extending flange portion 18, which is adapted to be forced against the adjacent end of the stub-shaft by a retaining nut 19 carried on thread 8. After being tightened, this retaining nut may be locked by means of any suitable known device, such as the lockwasher 20 which has on its inner circumference an inwardly projecting tongue 20a engaging a slot in the bolt, and an outer circumferential portion 20b adapted to be bent over the flat surface of the nut 19, as shown in the drawing. As will also be apparent from the drawing, the threaded bolt portion 7 engages threads in the left-hand end portion of the bore in stub-shaft 11.

The method of preventing accidental loosening of the thread 7 in the bore of stub shaft 11 when the nut 19 is being loosened or tightened is of interest. Such accidental turning of the bolt 3 is prevented by providing the flange portion 18 with a central opening which is not circular but square or hexagonal, mating with the polygonal portion 7a of the bolt. With this arrangement, the sleeve member is assembled by first engaging the thread 7 in the bore of stud shaft 11 with the hexagonal section 7a aligned so that the sleeve 12 can slide over the stub shaft with the spline teeth 17 in engagement and the hexagonal opening in flange 18 fitting over the hexagonal section 7a. This, of course, locks the stub shaft 11 relative to the bolt 3 so that the thread 7 cannot turn in the stub shaft. Thus, the retaining nut 19 may be tightened or loosened at will without fear of turning the thread 7 in stub shaft 11. This is important, since the coupling sleeve 12, if it is used as a part of the thrust bearing arrangement, or as a support for pinion teeth, may require frequent removal for inspection and servicing, while the bucket-wheels will need to be disassembled less frequently. Thus, with this arrangement, the coupling sleeve 12 is readily removed without disturbing the bolt 3 and the interfitting portions of the bucket-wheels.

The right-hand end of the through-bolt 3, with the threaded portion 6, projects from the second-stage wheel 2 and carries a nut 21, provided with a locking device in the form of a washer 22, having a circumferential portion 22a adapted to be peened into a recess milled in the adjacent face of bucket-wheel 2. These nut-locking devices described for the retaining nuts 19, 21 are well-known in the art, and it will be apparent that many equivalent arrangements may also be used. The extreme right-hand end of bolt 3 is provided with a flat-sided portion 23 adapted to be engaged by a suitable wrench for turning the thread 7 in the mating thread in stub-shaft 11.

The bucket-wheel 1 is of the so-called "composite" type disclosed in United States Patent 2,432,315, issued December 9, 1947, in the name of Alan Howard and assigned to the same assignee as the present application. This includes a web portion 24, which may be of a ferritic material having good strength at comparatively lower temperatures, welded to a rim portion 25 of an austenitic material, which is much more expensive but necessary in order to have the high temperature strength required of this hotter portion of the wheel. The circumferential row of buckets or blades 26 is secured to the rim portion 25 by any suitable means, for instance, any of the well-known "dove-tail" constructions.

The second-stage wheel 2 is of similar composite construction, having a circumferential row of buckets 27. It will be observed that the buckets 26, 27 have axially projecting base portions 28, 29 which almost meet to form the inner boundary of the gas flow passage between the buckets 26, 27. There is, however, a small clearance, shown at 30, so that mechanical contact and rubbing between the buckets will not occur regardless of any differential thermal expansion which may tend to close up this clearance.

The novel arrangement for insuring concentricity between the bucket wheels 1, 2 and transmitting torque therebetween is as follows.

The required concentric relation between bucket-wheels 1, 2 is accurately maintained during manufacture by the interfitting rabbet 4, consisting of a central boss 31 on wheel 1 engaging a circular recess 32 in wheel 2. Radially beyond this rabbeted portion 4, the bucket-wheels are provided with radially extending annular surfaces indicated at 3, which surfaces are held in tight abutting relation by the tension on the through-bolt 3. In this connection, it will be observed that there are significant axial clearance spaces, indicated at 34, 35 between the central portions of the wheels 1, 2, so that the only axially abutting surface is the radial surface 33.

The torque transmitting arrangement comprises a plurality of radially disposed cylindrical dowel pins 36. While, theoretically at least, the minimum number of pins could be three, equally spaced, a larger number is usually desirable to assure alignment and transmit torque. In the wheel structure specifically disclosed in the drawing, six equally-spaced pins are employed.

These dowel pins 36 are fitted by the simple process of clamping the two wheels 1, 2 together so that the radial surfaces at 33 are in tight abutting relation, then drilling radial holes to receive the pins 36. Of course, this is done before the buckets 26, 27 are assembled to the rims of the wheels, as the axial projections 28, 29 render the pins inaccessible after the wheels 1, 2 are bucketed.

It will be apparent that, at the high speeds encountered in normal operation, centrifugal force would throw the pins 36 out, and therefore suitable retaining means is provided, preferably in the form of a circumferential band member, shown in cross-section at 37 in the drawing. It will be seen that this retainer band fits annular grooves 38, 39 extending axially into the opposed radial faces of the bucket-wheels.

It will be understood from the above that the holes for receiving the dowel pins 36 are carefully drilled so that half of the hole is in each wheel face. It is also to be noted that the abutting radial surface 33 extends all the way out to the retaining band 37, as indicated in dotted lines at 33a in Fig. 1.

The method of assembly of this composite rotor is as follows. The separate bucket-wheels are welded and machined, as shown in the drawing, except for the radial holes for receiving the dowel pins 36. Before the buckets 26, 27 are assembled, the wheels are clamped together with the central rabbet 4 maintaining concentricity. The radial holes for pins 36 are then drilled, and may be reamed in order to get the accurate fit desired. The wheels are then separated and the buckets assembled. For final assembly, the through-bolt 3 is inserted from the left end of the stub-shaft 11, a wrench applied to the right-hand end portion 23, to cause the thread 7 to tighten in the bore of the stub-shaft, after which the coupling sleeve 12 may be assembled axially from the left as described above, and the retaining nut 19 and lockwasher 20 added. The wheel 1 is then supported in a horizontal position with the bolt 3 projecting vertically upward and the pins 36 are laid in the recesses 36a in the top surface of wheel 1. The retaining band 37 is then disposed around the outer ends of the dowel pins, with its lower edge engaging the groove 38. The bucket-wheel 2 may then be lowered over the bolt 3 and perfectly aligned so that the radial recesses in its lower face engage the dowel pins, and the annular groove 39 engages the upper edge of retaining band 37. The nut 21 may then be assembled, and is tightened to such a degree that the bolt stretches, so that the wheels are elastically held together by the "spring force" of the extended bolt. It will of course be appreciated that the degree to which the bolt 3 is stretched is carefully selected so that the wheels will be held together at the abutting surface 33, 33a with the compressive force required to keep the assembly tight at the operating speeds to be encountered, in spite of any differential thermal expansion which may take place between the parts.

It is to be particularly noted that this entire assembly process may be achieved without employing any press or shrink fits, although it may be found desirable in some cases to employ a press fit at the hub rabbet 4. In this connection it should be noted that the pins 36 fit very accurately the recesses in the opposed faces of the wheels, as is readily achieved by a simple drilling and reaming process, yet are not subjected to any axial crushing forces when the wheels are drawn together by the bolt 3. This is important as it eliminates the tendency of the pins 36 to stick or "gall." With this fitting and assembly method, a structure is obtained which is easy to pull apart when the retaining nut 21 is removed. This greatly facilitates the inspection, maintenance, and repair of the rotor.

It is also of interest to note that retaining ring 37 has sufficient flexibility that, when one bucket-wheel expands more than the other, due to the difference which exists in the wheel operating temperatures in normal operation, the band 37 is free to assume a somewhat conical shape corresponding to this differential increase in diameter of the wheels. At the same time, centrifugal force will tend to hold the band 37 tight against the radially outer walls of the grooves 38, 39 and it will also hold the dowel pins 36 out tight against the retaining band.

Thus it will be seen that the invention provides a composite gas-turbine rotor in which the separate wheels are maintained concentric regardless of temperature differences between the wheels which might tend to loosen the hub rabbet fit. At the same time, torque is transmitted between the wheels by a simple key arrangement which is much simpler, cheaper, and easier to build than the spline teeth or similar expedients employed by the prior art. It will also be observed that the comparatively high tension in the through-bolt 3 introduces no substantial bending forces in the disks. A further advantage is that the contour of the bucket-wheels need be modified only very slightly in order to effect the concentricity-maintaining and torque-transmitting functions. It will be apparent from the drawing that the finished contour of the separate wheels is substantially that which would be required to withstand the centrifugal wheel stresses, and only a very small amount of extra material need be added to the wheel by the connecting and fitting arrangement which constitutes this invention.

While only one form of the invention has been described specifically herein, it will be appreciated by those skilled in the art that many changes and substitutions of equivalents may be made. For instance, while the rotor described herein comprises only two bucket-wheels, it will be obvious that the structure lends itself equally well to rotors having three or more wheels. Also, the through-bolt 3 might be secured in the wheel 2, with the nut 21 at the left-hand end of the bolt. And the invention may be applicable to multi-stage axial flow compressors as well as to the gas turbine rotor described herein. It is, of course, intended to cover by the appended claims all such modifications as fall within the true spirit and scope of the invention.

What we claim as new and desire to secure by Letters Patent in the United States is:

1. A high temperature turbomachine rotor having two separately fabricated bucket-wheels, the abutting hub portions of the wheels defining an interfitting cylindrical rabbet for holding the wheels coaxial, the outer portion of each wheel around the rabbet forming a radially disposed annular surface with an annular groove extending axially thereinto, said annular surfaces adapted to be in abutting relation when the wheels are secured together, the outer wheel portions also defining a plurality of equally spaced radial recesses in said annular surfaces, each recess being formed part in one wheel and part in the abutting portion of the other wheel, a radially disposed key member in each recess, a retainer ring member disposed between the wheels and surrounding and adapted to be engaged by the outer ends of said key members with the circumferential edges of the ring engaging in the respective annular grooves in the wheels, and a through-bolt having one end secured to one wheel and the other end projecting through an axial bore in the other wheel with clamping means engaging an end surface of said other wheel to secure the wheels tightly together with said annular surfaces abutting and the hub rabbet and radial keys maintaining concentricity and transmitting torque between said wheels.

2. A high temperature turbomachine rotor having at least two separately fabricated bucket-wheels, at least one of the wheels having a central axial bore therethrough, the abutting hub portions of the wheels defining an interfitting cylindrical rabbet holding the wheels coaxial, the outer portion of each wheel around said rabbet forming a radially disposed annular surface with an annular groove extending axially thereinto, the outer wheel portions being adapted to be in abutting relation and defining a plurality of equally spaced recesses in said radial surfaces, each recess being formed part in one wheel and part in the abutting portion of the other wheel, radially disposed key means in each recess, retainer ring means disposed between the wheels with circumferential edge portions of the ring engaging in the respective grooves in the wheels and having portions adapted to abut the outer ends of the respective radial key members, and a central through-bolt extending through the axial bore of the bucket-wheel and projecting therefrom with retaining nut means adapted to clamp the bucket-wheels together and stretch the bolt to hold the wheels tightly together with the hub rabbet and radial key means maintaining concentricity and transmitting torque between said wheels.

3. A high temperature turbomachine rotor comprising at least two separately fabricated bucket-wheels, one of the wheels having a central bolt projecting axially therefrom, the adjacent wheel having an axial bore extending entirely therethrough for receiving said through-bolt, the adjacent portions of each wheel including an outer circumferential portion defining a radially disposed annular surface with an annular groove extending axially thereinto, said outer circumferential wheel portions adapted to be in abutting relation and defining a plurality of equally spaced radial recesses in said annular surfaces, each recess being formed part in one wheel and part in the abutting portion of the other wheel, a separate radial key member disposed in each recess, a retainer ring member disposed between the wheels surounding and adapted to be engaged by the outer ends of the key members with the circumferential edges of the retainer ring engaging in said respective annular grooves, and retaining nut means carried by the through-bolt and adapted to draw the wheels together to bring said outer annular radial surfaces into tight abutting engagement, whereby the radial keys maintain the wheels coaxial and transmit torque therebetween, while the retainer ring prevents centrifugal force from dislodging the keys from the recesses.

ERNEST L. ROBINSON.
CECIL M. GARDINER.

References Cited in the file of this patent

UNITED STATES PATENTS

| Number | Name | Date |
|---|---|---|
| 2,297,508 | Schutte | Sept. 29, 1942 |
| 2,452,782 | McLeod et al. | Nov. 2, 1948 |

FOREIGN PATENTS

| Number | Country | Date |
|---|---|---|
| 375,363 | Germany | May 12, 1923 |
| 616,407 | Great Britain | Jan. 20, 1949 |
| 903,268 | France | Jan. 10, 1945 |